(12) United States Patent
Gauffin

(10) Patent No.: US 11,068,284 B2
(45) Date of Patent: Jul. 20, 2021

(54) SYSTEM FOR MANAGING USER EXPERIENCE AND METHOD THEREFOR

(71) Applicant: Huuuge Global Ltd., Larnaca (CY)

(72) Inventor: Anton Gauffin, Berlin (DE)

(73) Assignee: Huuuge Global Ltd., Larnaca (CY)

(*) Notice: Subject to any disclaimer, the term of this patent is extended or adjusted under 35 U.S.C. 154(b) by 0 days.

(21) Appl. No.: 16/521,857

(22) Filed: Jul. 25, 2019

(65) Prior Publication Data

US 2021/0026657 A1 Jan. 28, 2021

(51) Int. Cl.
G09B 9/052 (2006.01)
G06F 9/451 (2018.01)
A63F 13/355 (2014.01)
G06N 20/00 (2019.01)
G06F 11/34 (2006.01)

(52) U.S. Cl.
CPC ............ *G06F 9/451* (2018.02); *A63F 13/355* (2014.09); *G06F 11/3438* (2013.01); *G06N 20/00* (2019.01); *G09B 9/052* (2013.01)

(58) Field of Classification Search
CPC ....... G09B 9/052; G06F 3/0488; A63F 13/56; G06T 13/00
See application file for complete search history.

(56) References Cited

U.S. PATENT DOCUMENTS

| | | | | | |
|---|---|---|---|---|---|
| 5,261,820 | A | * | 11/1993 | Slye | A63F 13/10 463/1 |
| 6,293,798 | B1 | * | 9/2001 | Boyle | G09B 19/16 434/29 |
| 9,737,817 | B1 | * | 8/2017 | Ricky | A63F 13/285 |
| 10,207,189 | B1 | * | 2/2019 | Gauffin | A63F 13/79 |
| 10,249,140 | B1 | * | 4/2019 | Gauffin | A63F 13/67 |
| 10,549,189 | B1 | * | 2/2020 | Yong | G06F 9/5077 |

(Continued)

FOREIGN PATENT DOCUMENTS

| | | | |
|---|---|---|---|
| CN | 109421052 A | * | 3/2019 |
| KR | 20170051073 A | * | 5/2017 |

(Continued)

OTHER PUBLICATIONS

Anonymous, "Drivatar (TM) in Forza Motorsport—Microsoft Research", XP055205468, Retrieved from the Internet URL: https://web.archive.org/web/20140419144409/http://research.microsoft.com/en-us/projects/drivatar/forza.aspx (retrieved on Jul. 30, 2015), Apr. 19, 2014, 5 pages.

(Continued)

*Primary Examiner* — Steven P Sax
(74) *Attorney, Agent, or Firm* — Ziegler IP Law Group, LLC

(57) ABSTRACT

A system for managing user experience in an application portal. The system includes an application recorder and a processing unit including a first module and a second module. The application recorder configured to capture data corresponding to actions of a first user in the first application. The processing unit communicatively coupled to the application recorder. The first module is configured to acquire the captured data from the application recorder and train a first digital entity based on the captured data to simulate the actions of the first user. The second module is configured to implement the first digital entity in the second application to perform the actions therein.

27 Claims, 10 Drawing Sheets

(56) References Cited

U.S. PATENT DOCUMENTS

| | | | |
|---|---|---|---|
| 2010/0013836 A1* | 1/2010 | Kang | G11B 27/034 |
| | | | 345/473 |
| 2010/0015579 A1* | 1/2010 | Schlabach | G06N 5/04 |
| | | | 434/11 |
| 2012/0206577 A1* | 8/2012 | Guckenberger | G09B 19/003 |
| | | | 348/47 |
| 2013/0083036 A1* | 4/2013 | Cario | G06T 13/00 |
| | | | 345/473 |
| 2013/0282444 A1* | 10/2013 | Karlsson | G06Q 30/0243 |
| | | | 705/7.37 |
| 2013/0316839 A1* | 11/2013 | Woo | A63F 13/06 |
| | | | 473/156 |
| 2014/0256447 A1* | 9/2014 | Woodman | A63F 13/497 |
| | | | 463/42 |
| 2015/0261647 A1* | 9/2015 | Sakaki | G06Q 10/0637 |
| | | | 703/21 |
| 2015/0293668 A1* | 10/2015 | Kurabayashi | A63F 13/67 |
| | | | 463/31 |
| 2016/0143075 A1* | 5/2016 | Tucker | H04W 72/10 |
| | | | 370/329 |
| 2017/0221484 A1* | 8/2017 | Poltorak | G10L 13/033 |
| 2017/0282063 A1* | 10/2017 | Krishnamurthy | A63F 13/69 |
| 2018/0053433 A1* | 2/2018 | Dunn | G09B 7/00 |
| 2018/0204476 A1* | 7/2018 | Laverty | G09B 5/065 |
| 2018/0243656 A1 | 8/2018 | Aghdaie et al. | |
| 2018/0318719 A1* | 11/2018 | Ma | G06F 9/451 |
| 2019/0005428 A1* | 1/2019 | Kras | G06Q 10/06314 |
| 2019/0028499 A1* | 1/2019 | Cidon | H04L 51/32 |
| 2019/0108768 A1* | 4/2019 | Mohamed | G09B 19/14 |
| 2019/0251603 A1* | 8/2019 | Jaatinen | G06Q 30/0275 |
| 2019/0321727 A1* | 10/2019 | Rodgers | A63F 13/56 |
| 2019/0388787 A1* | 12/2019 | Padmanabhan | A63F 13/47 |
| 2020/0030702 A1* | 1/2020 | Benedetto | A63F 13/847 |
| 2020/0282297 A1* | 9/2020 | Mehta | A63F 13/28 |
| 2020/0289943 A1* | 9/2020 | Rico | A63F 13/795 |

FOREIGN PATENT DOCUMENTS

| | | | | |
|---|---|---|---|---|
| WO | WO-0038135 A1 * | 6/2000 | | G06F 9/453 |
| WO | 2017066029 A1 | 4/2017 | | |
| WO | 2018004839 A1 | 1/2018 | | |
| WO | 2019113502 A2 | 6/2019 | | |

OTHER PUBLICATIONS

Anonymous: "In Forza Horizon 2, Computers Finally Drive as Crazy as Humans, WIRED", XP055397445, Retrieved from the Internet URL: https://www.wired.com/2014/09/forza-horizon-2-drivatars/ (retrieved on Aug. 9, 2017), Sep. 25, 2014, 5 pages.

Bogdanovic et al: "Deep Apprenticeship Learning for Playing Video Games", XP055707547, Retrieved from the Internet URL: https://www.cs.ox.ac.uk/people/nando.defreitas/publications/apprenticeship.pdf (retrieved on Jun. 22, 2020), Apr. 1, 2015, 3 pages.

European Patent Office, Extended European Search Report, Application No. 20185860.2, dated Nov. 3, 2020, 12 pages.

Van Lent, Michael, "AI for Adaptive Opponents, Teammates and NPCs" Internet Citation, XP001543516, Retrieved from the Internet URL: https://www.cmpevents.com/sessions/GD/AIforAdaptive.ppt (retrieved on Jan. 1, 1900), Mar. 9, 2005, 33 pages.

* cited by examiner

SYSTEM FOR MANAGING USER EXPERIENCE AND METHOD THEREFOR

TECHNICAL FIELD

The present disclosure relates generally to managing user experience in an application portal hosting a plurality of applications; and more specifically, to providing a digital entity to perform actions on behalf of a user in applications in an application portal.

BACKGROUND

In recent years, one of the common sources of entertainment for people has been playing digital games. Such digital games are played by an individual or a group of individuals. An individual tends to enjoy his/her free time by playing such a digital game. The digital game keeps the individual engaged with its content by providing a captivating and engaging experience. The digital game is generally played with assistance of a user-device such as a cell phone, a laptop, a tablet and the like. Further, the digital game may be played using an online server or a stand-alone user-device.

Furthermore, the digital game is played based upon certain constraints. The individual playing the digital game is guided for following the constraints by way of certain instructions that appear on user interface such as screen of the user-device. Moreover, the digital game involves multiple levels of content and complexity throughout its course. The individual during the course of the digital game progresses through the levels by learning the constraints of playing the digital game.

Notably, the individual while playing the game learns constraints of the digital game and gains expertise in playing the digital game. Furthermore, the individual may be interested in playing different levels of the digital game or any other digital game having similar content and complexity. The individual may use the gained expertise for playing levels of the other digital game. However, the individual may get bored while playing the other digital game due to similar content. In addition, the individual may feel lack of learning due to similar content of the other digital game. Consequently, the individual may lose interest in playing. Furthermore, playing similar levels to reach a learning point in the game leads to waste of time and effort. Therefore, lack of interest leads to an unsatisfying user experience for the individual.

Therefore, in light of the foregoing discussion, there exists a need to overcome the aforementioned drawbacks associated with management of user experience while using digital game applications.

SUMMARY

The present disclosure seeks to provide a system for managing user experience in an application portal hosting a plurality of applications. The present disclosure also seeks to provide a computer implemented method for managing user experience in an application portal hosting a plurality of applications. The present disclosure seeks to provide a solution to the existing problem of boredom and monotony experienced by a user while playing games, to provide an overall satisfying experience for the user. An aim of the present disclosure is to provide a solution that overcomes at least partially the problems encountered in prior art, and provide an efficient and seamless approach for managing user experience in an application portal hosting a plurality of applications.

In one aspect, an embodiment of the present disclosure provides a system for managing user experience in an application portal hosting a plurality of applications, including a first application and a second application, the system comprising:
an application recorder configured to capture data corresponding to actions of a first user in the first application; and
a processing unit communicatively coupled to the application recorder, the processing unit comprising:
a first module configured to:
acquire the captured data from the application recorder; and
train a first digital entity based on the captured data to simulate actions of the first user; and
a second module configured to implement the first digital entity in the second application to perform actions therein.

In another aspect, an embodiment of the present disclosure provides a computer implemented method for managing user experience in an application portal hosting a plurality of applications, including a first application and a second application, the method comprising:
capturing data corresponding to actions of a first user in the first application;
training a first digital entity based on the captured data to simulate actions of the first user; and
implementing the first digital entity in the second application to perform actions therein.

Embodiments of the present disclosure substantially eliminate or at least partially address the aforementioned problems in the prior art, and enable maintenance of interest of a user in the plurality of applications by reducing a repetitive action to be performed by the user in a plurality of applications. Consequently, the system efficiently and seamlessly manages a user experience in an application portal hosting a plurality of applications.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
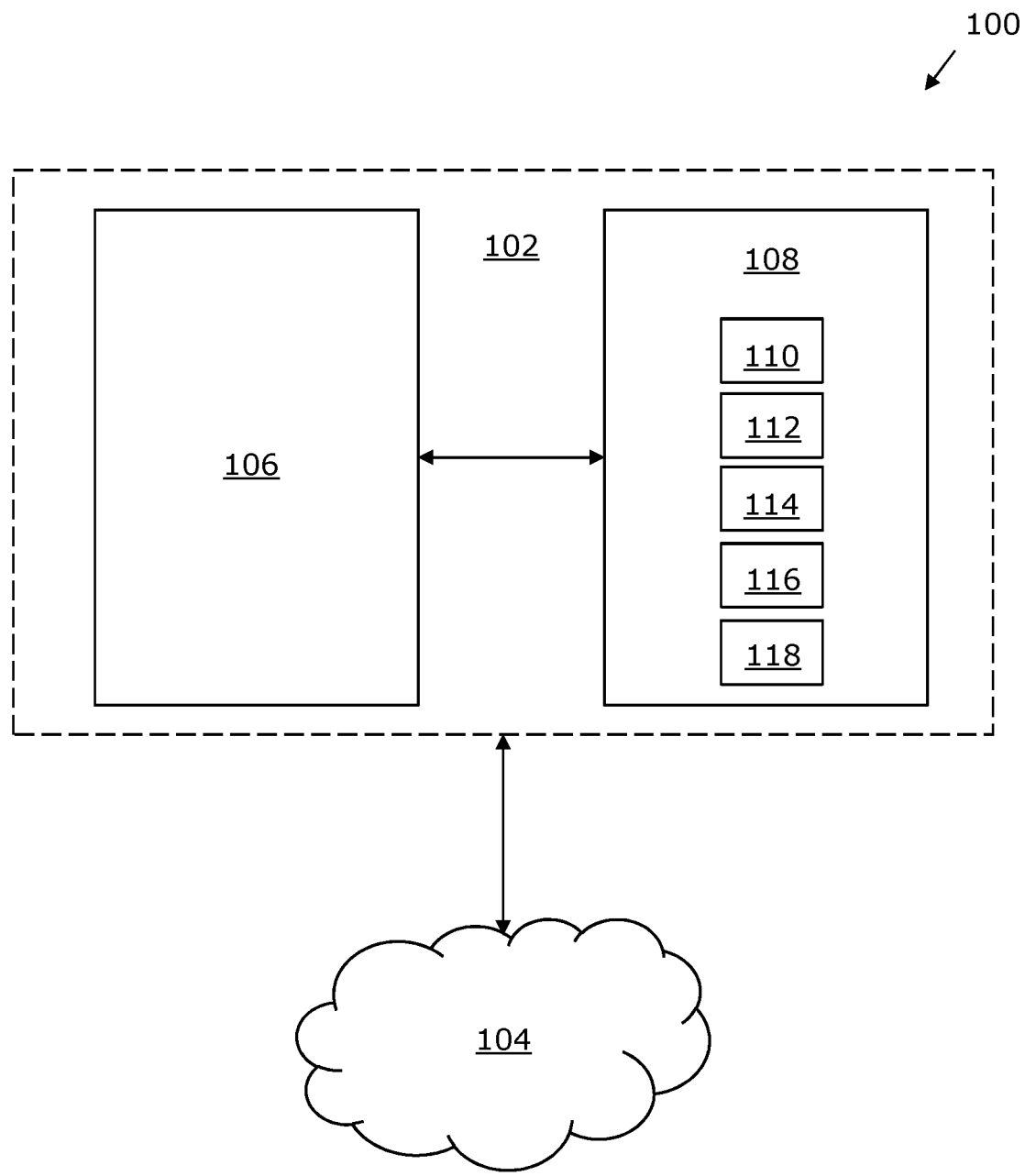
FIG. 1 is a block diagram of a system in association with an application portal in a network environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for managing user experience in an application portal hosting a plurality of applications, including a first application and a second application, the system comprising:

an application recorder configured to capture data corresponding to actions of a first user in the first application; and a processing unit communicatively coupled to the application recorder, the processing unit comprising:

a first module configured to:

acquire the captured data from the application recorder; and train a first digital entity based on the captured data to simulate actions of the first user; and a second module configured to implement the first digital entity in the second application to perform actions therein.

In another aspect, an embodiment of the present disclosure provides a computer implemented method for managing user experience in an application portal hosting a plurality of applications, including a first application and a second application, the method comprising:

capturing data corresponding to actions of a first user in the first application;

training a first digital entity based on the captured data to simulate actions of the first user; and implementing the first digital entity in the second application to perform actions therein.

The system and method disclosed herein provides an efficient and seamless approach for managing user experience in an application portal hosting a plurality of applications. Herein, the user experience is enhanced by providing a digital entity that assists the user in interaction with other applications in a controlled and an organized manner. Beneficially, the system enables the user to make significant progress while using the plurality of applications in a substantially reduced period of time. Moreover, the system aids in maintaining an interest of a user in the plurality of applications by reducing repetitive actions to be performed by the user in the plurality of applications. Notably, the system also assists the user in selection of one or more applications that are predictably likely in accordance with the interests of the user. Furthermore, the user is enabled to control the progress in the plurality of applications whilst saving a considerable amount of time at the same time. In addition, the system and method disclosed herein are independent of the application portal.

The present disclosure provides a system for managing user experience in an application portal hosting a plurality of applications. Throughout the present disclosure the term "application portal" as used herein refers to an interactive platform comprising a plurality of related applications that may be accessed by one or more users. The users may include a first user, an optionally a second user. Generally, the application portal is implemented in a cloud server that may be used to access the application portal by the one or more users. More optionally, the application portal is a password protected platform that requires registration by the one or more users. Further, the application portal may be configured to enable a web-service provider to track details related to user-activities on the application portal. The system can be implemented for different types of application portals that include but are not limited to E-commerce portal, online chatting portals, gaming portals and so forth. According to an embodiment the term application portal can also refer to a situation where two independent application portals form the application portal. In such an example a first independent application portal might host the first application and a second independent application portal might host the second application.

Throughout the present disclosure, the term "cloud server" refers to a virtual server or a platform comprising structure and/or module that includes programmable and/or non-programmable components configured to store, process and/or share information. The cloud server is generally built, hosted and delivered through a cloud computing platform via internet. Moreover, the cloud server can be accessed by the first user and the second user remotely.

As discussed, the application portal hosts a plurality of applications, including a first application and a second application. Preferably, the application portal is a video games library, and the first application and second application are of a same genre of video games. In an example, the application portal may be a gaming portal. The gaming portal may include, for example, Microsoft Xbox™, the Nintendo Wii™, Sony PlayStation™ and the like. In an example, the application portal, such as the gaming portal may comprise plurality of applications, such as gaming applications. The first user may be required to register on the application portal to access the gaming applications available on the application portal. Moreover, the first user may be required to enter a password pre-set by the first user while registering on the application portal, to access the gaming applications on the application portal. Hereinafter, the application portal is a gaming portal hosting a plurality of games, unless mentioned otherwise.

Throughout the present disclosure the term "plurality of applications" refer to complete, self-contained computer programs designed to perform specific functions, tasks, or activities for the first user, that are made available on the application portal in order to be accessible by the first user. Optionally, the plurality of applications are gaming applications. For example, the application portal such as the gaming portal may comprise a number of gaming applications of various genres, such as racing games, adventure games, puzzle games, wagering games, action games, role-playing games (RPG), strategy games, shooting games, simulation games and so forth. In an example, the gaming application is designed to provide an interactive environment to the first user to play a game thereon. The first user is allowed to play a game on the gaming application, after the first user has gained access to the gaming application. The first user may be allowed to play a game on the application in a real-time mode, a near real-time mode or an offline mode, depending upon features of the application. The application may be a single-player gaming application or a multiplayer gaming application. As aforementioned, the plurality of applications include the first application and the second application. Optionally, the first application and the second application belong to a same genre of applications, for example if the first application is a war-based strategy game, then the second application may also be a war-based strategy game. It will be appreciated that the terms "first application" and "second application" should not unduly limit the scope of the claims herein. The terms "first application" and "second application" are only indicative of two applications in the application portal to be accessed by the first user. It shall be understood that the application portal hosts a plurality of applications that the first user is enabled to access, including the first application and the second application. For the purpose of this disclosure, it is to understood that any application from the application that is accessed by the first user without any intervention from first digital entity (as explained later in detail) is termed as the "first application", and any application (other than the first application) that the first user is directed towards after the application is accessed by the first digital entity is termed as the "second application".

Notably, the user can interact with the application portal via using a conventional pointing device such as a mouse, keyboard, joystick, a touch sensitive input device associated with a user device for providing inputs to the plurality of applications. Throughout the present disclosure, the term "user device" generally relates to an electronic device associated with (or used by) a user that is capable of enabling the user to perform specific tasks associated with the application portal. Furthermore, the user equipment is intended to be broadly interpreted to include any electronic device that may be used for voice and/or data communication over a wireless communication network. The user devices can include and is not limited to a, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs), a video slot machine, a video poker machine, a kiosk, a casino personal device, and typically includes many or all of the elements described above relative to the gaming apparatus.

It will be appreciated that the plurality of applications including the first application and the second application are accessible to a number of users including the first user and the second user via such user devices. In an example, the first user and the second user may access the application portal via the same user device. In another example, the first user and the second user may access the application portal through two different user devices. Notably, a number of users are allowed to access the application portal at a time through their respective user devices. Throughout the present disclosure, the term "user" as used herein relates to a person (i.e., human being) using the application portal to access the plurality of applications. Notably "first user" and the "second user" are only indicative of two different users accessing the application portal and not unduly limit the scope of the claims herein. Hereinafter, the terms "first user" and "second user" along with a number of other users may sometimes be collectively referred to as "users".

Optionally, the application portal is interactively accessible to the users via a user interface associated with user devices of the respective users. Throughout the present disclosure, the term "user interface" relates to a structured set of user interface elements rendered on a display screen associated with the user device. Optionally, the user interface (UI) rendered on the display screen is generated by any collection or set of instructions executable by an associated digital system. Additionally, the user interface (UI) is operable to interact with the users to convey graphical and/or textual information and receive input from the user. Specifically, the user interface (UI) used herein is a graphical user interface (GUI). Furthermore, the user interface (UI) elements refer to visual objects that have a size and position in user interface (UI). A user interface element may be visible, though there may be times when a user interface element is hidden. A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like. Beneficially, the user interface facilitates user interaction in the gaming applications within the application portal.

For the purpose of the present disclosure, there will now be considered an exemplary network environment, wherein the system comprising the application recorder and the processing unit are in communication with the application portal via a communication network. Throughout the present disclosure, the term "communication network" relates to an arrangement of interconnected programmable and/or non-programmable components that are configured to facilitate data communication between one or more electronic devices and/or databases, whether available or known at the time of filing or as later developed. Furthermore, the communication network may include, but is not limited to, one or more peer-to-peer network, a hybrid peer-to-peer network. Herein, the communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks. Additionally, or alternatively, the computing devices may use their own Bluetooth® network, and connect to a Bluetooth® server, to synchronize with other electronic devices.

It will be appreciated that the network environment may be implemented in various ways, depending on various possible scenarios. In one example scenario, the network environment may be implemented by way of a spatially collocated arrangement of the server and the database. In another example scenario, the network environment may be implemented by way of a spatially distributed arrangement of the application recorder and the processing unit coupled mutually in communication via the communication network. In yet another example scenario, the application recorder and the processing may be implemented via cloud server.

The application recorder is configured to capture data corresponding to actions of a first user in the first application. Throughout the present disclosure, the term "application recorder" as used herein refers to one or more software configured to capture the data corresponding to actions performed by the user in the first application, such as the gaming application. In an example, the application recorder may function as an independent unit and executed in the cloud server. In another example, the application recorder is implemented as a module integrated within the user device associated with the first user. In additional example the application recorder is a software library component included in an application code. The software library component in such example is configured to record and collect actions and function calls within the application as the application is executed. The application recorder is configured to successively capture data corresponding to actions of the first user in the first application. In an example, if the first user accesses the first application "N" number of times, the application recorder is configured to capture the data corresponding to actions of the first user "N" number of times. Furthermore, the application recorder is configured to capture data corresponding to actions of the second user on the first application. Additionally, the application recorder is configured to successively capture data corresponding to actions of the first user on one or more other applications, other than the first application, in the application portal. Optionally, the user may access the application recorder in order to regulate a functionality of the application recorder. For example, the user may be allowed to enable or disable the functionality of the application recorder as desired by the user.

Optionally, the data captured by the application recorder comprises at least one of: a duration of time taken by the first user to perform each of the actions in the first application, skills executed by the first user to perform each of the actions in the first application, and a number of levels successfully completed by the first user in the first application. In an example, the duration of time taken by the first user to perform each of the actions in the first application may correspond to, a duration of time taken by the first user to make a move a character or tool in the first application in order to avoid to obstructions in the first application, a duration of time taken by the first user to react to firing shots in the first application or duration of time taken by the first user to initiate firing shots, a duration of time taken by the first user to achieve a particular position in the first application and so forth. In an example, the skills executed by the first user to perform each of the actions in the first application may correspond to, precision of performing an action such as taking a head shot in war-based games or taking a sharp definition curve in racing games, decision making skills such as management of resources in strategy-based games or wager-based games, highest rewards collected in a game and so forth. It will be appreciated that the data captured by the application recorder may be based on the type of application hosted in the application portal.

Notably, the data is acquired from the user devices as inputs received by the pointing devices. In an example, when the input is received via a touchscreen associated with a user device, the data is acquired as number of times the touchscreen is touched (that is, tapped) and location of the touch on the touchscreen by the first user to control a character in the first application. In another example, when the input is received via a keypad associated with a user device, the data is acquired as number of times a particular key (or a set/combination of keys) is pressed by the first user to perform a particular action dedicated to control a character in the first application. In yet another example, the data can be acquired as motion of the user device, such as in case of motion-based applications (such as a car racing gaming application). Herein, the data is acquired as a particular angle at the which the user device is tilted (for example, as measured by a gyroscope or accelerometer of the user device) to control the character (herein, for example, a car) in the first application. It will be appreciated that there can be a number of ways in which data can be recorded by the application recorder based on the type of user device that is associated with the user.

Optionally, the data acquired by the application recorder is stored in a database. The database is communicatively coupled to the application recorder and the processing unit. Throughout, the present disclosure, the term "database" as used herein refers to an organized body of digital information regardless of the manner in which the data or the organized body thereof is represented. Optionally, the database may be software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9. Optionally, the database may be used interchangeably herein as database management system, as is common in the art. Furthermore, the database management system refers to the software program for creating and managing one or more databases. Optionally, the database may be operable to supports relational operations, regardless of whether it enforces strict adherence to the relational model, as understood by those of ordinary skill in the art.

Optionally, the application recorder stores the captured data in a memory associated with the user device. The term "memory" used herein refers to a volatile or persistent medium, such as an electrical circuit, magnetic disk, virtual memory or optical disk, in which a device can store data or software for any duration. Optionally, the memory is non-volatile mass storage such as physical storage media. Furthermore, the memory can be distributed in a scenario wherein the system is distributed.

The processing unit is communicatively coupled to the application recorder. Throughout the present disclosure the term "processing unit" refers to a computational element that is operable to respond to and processes instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor unit" may refer to one or more individual processors, processing devices and various elements associated with a processing device that may be shared by other processing devices. Additionally, the one or more individual processors, processing devices and elements are arranged in various architectures for responding to and processing the instructions that drive the system.

The data acquired by the application recorder is transmitted to the processing unit for further processing. Optionally, the data acquired from the application recorder is transmitted to the processing unit in the form of sets of data, referred to as training dataset hereinafter. In an example, when the first user performs actions on the first application for a first time, a first set of training data is generated. Further, when the first user performs subsequent actions on the first application, a second set of training data is generated. Similarly, "N" number of training datasets are generated, such as the first training dataset, second training dataset and so on to the Nth training dataset. Each of the training dataset generated by the actions of the first user in the first application are then transmitted to the processing unit.

The processing unit comprises a first module. The first module is configured to acquire the captured data from the application recorder. In an example, the first module is configured to receive a number of training datasets as transmitted by the application recorder. Optionally, the first module comprises a receiving unit to receive the captured data from the application recorder. Further, the first module is configured to train a first digital entity based on the captured data to simulate the actions of the first user. Notably, the first digital entity is generated by the first module and thereby trained to simulate the actions of the first user based on the captured data. Herein, the first digital entity refers to a virtual player that mimics the actions of the first user. The first digital entity is configured to replicate actions of the first user. Furthermore the first digital entity might be configured to be able to replicate each and every action of the first user. In some embodiment the first digital entity might be trained to be even more skillful than the first user. The first digital entity will possess a similar skill level that is acquired by the first user in the first application. In an example, if the first user possesses an expertise level in playing the first application, then the first digital entity is configured to possess the same expertise level as the first user.

Optionally, the first module implements machine learning algorithms for training of the first digital entity. Notably, the first digital entity is trained based on the training datasets received by the first module. Throughout the present disclosure the term "machine learning algorithms" as used herein refers to software-based algorithms that are executable upon computing hardware and are operable to adapt and adjust their operating parameters in an adaptive manner depending upon information that is presented to the software-based algorithms when executed upon the computing hardware. Optionally, the machine learning algorithms include neural networks such as recurrent neural networks, recursive neural networks, feed-forward neural networks, convolutional neural networks, deep belief networks, and convolutional deep belief networks; self-organizing maps; deep Boltzmann machines; and stacked de-noising auto-encoders. Optionally, the machine learning algorithms employ any one or combination of the following computational techniques: constraint program, fuzzy logic, classification, symbolic manipulation, fuzzy set theory, evolutionary computation, cybernetics, data mining, approximate reasoning, derivative-free optimization, decision trees, or soft computing. Moreover, the term "neural network" as used herein can include a highly interconnected network of processing elements, each optionally associated with a local memory. In an example, the neural network may be Kohonen map, self-organizing maps, multi-layer perceptron and so forth. Furthermore, the processing elements of the neural networks can be "artificial neural units", "artificial neurons", "neural units", "neurons", "nodes" and the like. Moreover, the neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained. It will be appreciated that as the first module implements machine learning algorithms, more the number of training datasets available for training the first digital entity, greater is the accuracy of the first digital entity in terms of simulating the actions of the first user.

Optionally, the first digital entity associated with the first user is an artificial intelligence bot. The artificial intelligence bot refers to an autonomous program trained through the artificial intelligence, present on a network such as the cloud server or the user device that interacts with the plurality of applications in the application portal. Herein, in the present disclosure, the artificial intelligence bot is configured to behave in a manner that is similar to a user playing games on the gaming applications. For example, the artificial intelligence bot mimics the behavior of the user, such as actions performed by the user to clear levels in the application such as a gaming application. The term "artificial intelligence" as used herein relates to any mechanism or computationally intelligent system that combines knowledge, techniques, and methodologies for controlling a bot, such as the first digital entity or other element within a computing environment. Furthermore, the artificial intelligence (AI) is configured to apply knowledge and that can adapt it-self and learn to do better in changing environments. Additionally, employing any computationally intelligent technique, the artificial intelligence (AI) is operable to adapt to unknown or changing environment for better performance. The artificial intelligence (AI) includes fuzzy logic engines, decision-making engines, pre-set targeting accuracy levels, and/or programmatically intelligent software. The artificial intelligence (AI) in the context of the present disclosure relates to software-based algorithms that are executable upon computing hardware and are operable to adapt and adjust their operating parameters in an adaptive manner depending upon information that is presented to the software-based algorithms when executed upon the computing hardware. Optionally, artificial intelligence (AI) employ any one or combination of the following computational techniques: constraint program, fuzzy logic, classification, conventional artificial intelligence, symbolic manipulation, fuzzy set theory, evolutionary computation, cybernetics, data mining, approximate reasoning, derivative-free optimization, decision trees, or soft computing.

Optionally, the first module is configured to iteratively train the first digital entity based on the data corresponding to actions of the first user on the first application for a number of times. In an example, when the first user performs actions on the first application for a first time, a first training dataset is generated and the first module is configured to train the first digital entity for the first time. Further, when the first user performs actions on the first application for a second time, a second training dataset is generated and the first module is configured to train the first digital entity for the second time. In a similar manner, the when the first user performs actions on the first application for Nth time, a nth training dataset is generated and the first module is configured to train the first digital entity for the Nth time. As explained, the first digital entity is iteratively trained and constantly updated based on the training datasets received by the first module, as the first user accesses the first application a number of times. Notably, when the first application has been accessed "N" number of times, the first digital entity may have been trained for a total of "N" number of times. It will be appreciated that the first digital entity is constantly updated based on the iterative training dataset received from the application recorder as the first user progresses in the first application. For example, in case of gaming applications, the first user may deliver a better performance in the first application for second time or third time than the first time, then the first digital entity will be updated in terms of skills according to the performance of the first user for the second time.

Optionally, the first module is further configured to iteratively train the first digital entity based on the data corresponding to actions of the first user on the one or more other applications. In an example, when the first user performs actions on the first application for "i" number of times, "i" number of training datasets are successively generated, and the first module is configured to iteratively train the first digital entity "i" number of times on the corresponding generated datasets. Further, when the first user performs actions on a second application for "j" number of times, "j" number of training datasets are successively generated, and the first module is configured to iteratively train the first digital entity "j" number of times on the corresponding generated datasets. Further, when the first user performs actions on an Nth application for "k" number of times, "k" number of training datasets are successively generated, and the first module is configured to iteratively train the first digital entity "k" number of times on the corresponding generated datasets. As explained, the first digital entity associated with the first user is iteratively trained and constantly updated based on the training datasets received by the first module, as the first user accesses the first application, the second application and so on till the Nth application for "i" times, "j" times and "k" times respectively. Notably, when the Nth application has been accessed "k" number of times, the first digital entity has been trained for a total of (i+j+k) number of times. It will be appreciated that the first digital entity is iteratively updated based on the "i" number of training datasets, "j" number of training datasets and "k" number of training datasets received from the application recorder as the first user progresses in the first application, the second application and the Nth application respectively.

Further, the processing unit comprises a second module. The second module is configured to implement the first digital entity in the second application to perform the actions therein. That is, the first digital entity that is trained to simulate the actions of the first user is implemented in the second application. Notably, when the first digital entity accesses the second application, the first digital entity performs actions on the second application generally in a similar manner that the first user would have performed. As mentioned, the first digital entity is an artificial intelligence bot that accesses the second application to simulate the actions of the first user in order to control certain characters or tools in the second application.

Optionally, the second application comprises an application program interface to check for compatibility of the first digital entity with the second application. The term "application program interface" as used herein refers to refers to a set of functions that can be called from an application program to access features of another program. Furthermore, the application program interface (API) is a software interface that includes one or more routines, data structures, object classes, and/or protocols that support the interaction of an archiving platform and a storage system. An application program interface (API), for example, includes building blocks for enabling the building of a software application that is consistent with a particular application or operating environment. An API can be specified in terms of a programming language that can be compiled at application build time. Notably, the application program interface is configured to allow the second module for implementation of the first digital entity in the second application if the first digital entity is compatible with the second application.

In an embodiment, the second module is configured to control a point of entry of the first user in the second application based on the actions performed by the first digital entity in the second application. Herein, the term "point of entry" refers to a point or a level in the second application that the first user is allowed to access or start from. Herein, the point of entry may be a level in second application where the first user is directed to resume actions in the second application, from a point of discontinuation of the first digital entity. Notably, the point of entry for the first user in the second application succeeds the point of exit for the first digital entity. The point of entry of the first user is after a point in the second application, after which the second application is inaccessible to the first digital entity. Furthermore, the accessibility of the second application to the first digital entity depends on a skill level acquired by the first digital entity. Beneficially, the second module is configured to provide access to the first user directly to the point of entry of the second application, and not to an initial point in the second application. In an example, a second application includes 10 levels, and the first digital entity manages to clear 5 levels in the second application, then the point of entry for the first user in the second application is the 6th level. When the first user interacts with the second application for the first time, the first user is directed to the 6th level without having to clear the previous (initial) 5 levels in the second application. Henceforth, the system enables the user to experience the excitement of playing different video games while avoiding the boredom of playing each and every game from an initial level thereof. Furthermore the system enables to save computing resources as the first user can skip unneeded levels of the second application.

According to an embodiment, the processing unit further comprises a third module. The third module is configured to allow the first user to set one or more permissions about implementation of the first digital entity corresponding thereto for the plurality of applications in the application portal. Herein, the one or more permissions may include, but are not limited to, permission to access a particular genre of applications, permission to access applications that are above a defined rating, permission to access the second application for a defined period of time, permission to access the second application up to a particular level in the second application and so forth. Optionally, the third module creates a profile of the first user, and associates the first digital entity to the profile of the first user. The profile of the first user may also be customized by the user, by defining a user name and setting a password unique to the profile of the first user. Further, the first user is allowed to access his/her own profile by entering a valid combination of the username and the password that is unique to the first user, and set one or more permissions about the implementation of the first digital in the application portal. Notably, as aforementioned, the first digital entity is an artificial intelligence bot that when implemented in one or more applications simulates the actions of the first user. However, certain permissions may be defined by the first user to control the implementation of the first digital entity in order to personalize the first digital entity according to needs of the first user. Optionally, the third module is further configured to limit access of the second module to the second application for implementation of the first digital entity therein up to a predetermined number of initial levels therein based on the one or more permissions set by the first user corresponding to the second application. It will be appreciated that the third module is configured to create a profile for each of the users associated with the application portal. Optionally, profiles of each of the users can be stored in the database, and can be accessed by respective users via the communication network. Alternatively, the profile of the users is stored in the memory associated with the respective user device of each of the users.

Optionally, the first user may define the initial level up to which the first digital entity is allowed to perform actions in the second application. When the first user sets permission to restrict the implementation of the first digital entity beyond a predetermined level, the access of the second module to the second application is allowed only up to the predetermined level in the second application. In an example, the first user may set the permission up to level 5 in the second application that can be accessed by the first digital entity. Therefore, the second module will implement the first digital entity in the second application to perform actions and complete gameplay only up to level 5. The second module will not provide access to the first digital entity beyond level 5. Further, when the first user interacts with the second application, the point of entry for the first user is level 6, while all the levels prior to level 6 would already had been cleared by the first digital entity.

According to an embodiment, the processing unit further comprises a fourth module. The fourth module is configured to compare the captured data for the second user to the captured data for the first user. Optionally, each of the training dataset of the first user is compared with the each of the dataset of the second user. Specifically, a comparison is made between the actions performed by the first user and the actions performed by the second user in the same first application. Further, the fourth module is configured to determine a matching score based on the comparison. Herein, the matching score is a calculated value that determines how closely the training datasets of the first user are related to the training datasets of the second user. The matching score is a quantitative measure of co-relation between the training dataset of the first user and the training dataset of the second user. It will be appreciated that the matching score is generally a measure of similarity between the playing skills of the first user and the second user.

Further, the fourth module is configured to associate the generated first digital entity of the first user with the second user for implementation thereby, if the matching score is above a predetermined threshold. Herein, the predetermined threshold is a minimum calculated value of the matching score below which the actions of the first user and the actions of the second user cannot be considered as similar. It will be appreciated that if the matching score determined for the first user and the second user exceeds the predetermined threshold value, a second digital entity need not be generated, and the first digital entity is associated with the second user as well. In an example, the first digital entity associated with the second user may be a replica of the first digital entity that is associated with the second user. Henceforth, the first digital entity may simultaneously be associated with both the first user and the second user and be implemented in any of the plurality of applications.

According to an embodiment, the processing unit further comprises a fifth module. The fifth module is configured to receive a rating value for the first application from the first user. The first user accesses the first application and provides the rating value for the first application based on an experience of the first user with the first application. Notably, the first user may provide the rating value based on a number of parameters such as graphics of the first application, an ease of controlling the first application, audio and visual effects of the first application, an entertainment factor while interacting/playing with the first application, a market reputation of the first application, a popularity of the first application, and the like. Notably, the rating value depends on the preferences of the first user. Therefore, the rating value received for the first application from the first user may be different from a rating value received from the second user.

Further, the fifth module is configured to implement, consecutively, the first digital entity associated with the first user in the plurality of applications in the application portal. Notably, the first digital entity is configured to simulate the skills of the first user in each of the plurality of applications accessed by the first digital entity. Further, the fifth module is configured to calculate a rating value for each of the plurality of applications based on the rating value for the first application received from the first user. The rating value for each of the plurality of applications is based on the interaction of the first digital entity with each of the plurality of applications. As the first digital entity behaves in a similar manner as the first user would have while interacting with each of the plurality of applications, the fifth module is configured to calculate the rating value for each of the plurality of applications with which the first digital entity interacts. The rating value for each of the plurality of applications is calculated by considering the rating value for the first application as reference. It will be appreciated that rating value is not limited numeric rating (for example, a number on a scale of 1 to 10, 10 being the highest), but may also include, a letter rating, a star rating, an alphanumeric rating, or the like.

Optionally, the fifth module is further configured to generate recommendations of one or more applications from the plurality of applications for the first user based on the respective calculated rating values therefor. Specifically, the fifth module is configured to compare the rating value of the first application with the rating value calculated for each of the plurality of applications, to determine one or more applications that will be most preferred by the first user. For this purpose, the rating values of each of the plurality of applications are ranked to form a list having the plurality of applications arranged in a preferential order. From this list, one or more applications are selected from the top of the list and presented to the first user as recommendations. In an example, the list of recommended one or more applications is presented to the first user in the user interface related to the profile of the first user, and the first user is allowed to choose from the recommended list of one or more applications. In another example, the one or more applications may be recommended to the first user one by one in the preferential order as generated, by directing the first user to an application one at a time as the first user is done playing the previous application and wishes to move to another application. Such a system ensures that the users are guided to play particular games akin to the interests of the respective users and not just any random game from the plurality of applications.

In an example, the first digital entity is implemented in "N" number of applications in the application portal consecutively. With respect to the application portal, the first application is accessed by the first user, and a rating value (namely, R1) is received from the user depicting a likeness of the first user. Further, a first digital entity is generated simulating the actions of the actions of the first user. The generated first digital entity is then implemented in a second application, a third application, a fourth application up to the Nth application from the application portal. Based on the rating value of the first application, a rating value for each of the plurality of applications is calculated, namely R2, R3, R4 and RN corresponding to the second application, the third application, the fourth application, and the Nth application respectively. Further, each of the ratings R2, R3, R4, up to RN are arranged in a preferential order and one or more applications are then recommended to the first user.

According to an embodiment, the system is further configured to implement beta testing of the plurality of applications. Throughout the present disclosure, the term "beta testing" refers to a software testing process that is used for quality control of applications, such as gaming applications. Herein, the beta testing is performed by the first digital entity. As mentioned, the first digital entity may be implemented in a plurality of applications, and then a rating value can be calculated for each of the plurality of applications accessed by the first digital entity. For the purpose of beta testing, the profiles of some of the best performing users (such as professional garners) may be accessed (after receiving permissions therefrom) and then the respective digital entities of the best performing users can perform testing of a particular application to assess a quality of the application, primarily before the launch of the application. Such a system for implementing beta testing is an economical and faster way of beta testing for the plurality of application, especially computer games.

As aforementioned, the present disclosure also provides the computer implemented method for managing user experience in an application portal hosting a plurality of applications. Such a method is described in greater detail herein below. The embodiments and details disclosed above apply mutatis mutandis to the said method for managing user experience in an application portal hosting a plurality of applications.

The method comprises capturing data corresponding to actions of a first user in the first application. Further, the method comprises training a first digital entity based on the captured data to simulate actions of the first user, and implementing the first digital entity in the second application to perform actions therein.

Optionally, the method further comprises controlling a point of entry of the first user in the second application based on the actions performed by the first digital entity in the second application.

Optionally, the method further comprises checking for compatibility of the first digital entity with the second application; and allowing the implementation of the first digital entity in the second application if the first digital entity is compatible with the second application.

Optionally, the method further comprises allowing the first user to set one or more permissions about implementation of the first digital entity corresponding thereto for the plurality of applications in the application portal.

Optionally, the method further comprises limiting implementation of the first digital entity in the second application up to a predetermined number of initial levels therein based on the one or more permissions set by the first user corresponding to the second application.

Optionally, the method further comprises capturing data corresponding to actions of a second user on the first application; comparing the captured data for the second user to the captured data for the first user; determining a matching score based on the comparison; and associating the generated first digital entity of the first user with a profile of the second user for implementation thereby, if the matching score is above a predetermined threshold.

Optionally, the method further comprises receiving a rating value for the first application from the first user; implementing, consecutively, the first digital entity in the plurality of applications in the application portal; and calculating the rating value for each of the plurality of applications based on the rating value for the first application received from the first user.

Optionally, the method further comprises generating recommendations of one or more applications from the plurality of applications for the first user based on the respective calculated rating values therefor.

Optionally, the method further comprises successively capturing data corresponding to actions of the first user on one or more other applications, from the first application, in the application portal, and wherein the first module is further configured to iteratively train the first digital entity based on the data corresponding to actions of the first user on the one or more other applications.

DETAILED DESCRIPTION OF THE DRAWINGS

Referring to FIG. 1, illustrated is a block diagram of a network environment 100, in accordance with an embodiment of the present disclosure. The network environment includes a system 102 and an application portal 104. The system 102 manages user experience in the application portal 104 by hosting a plurality of applications. As shown, the system 100 comprises an application recorder 106 and a processing unit 108. The processing unit 108 is communicatively coupled to the application recorder 106. Further, the processing unit 108 comprises a first module 110, a second module 112, a third module 114, a fourth module 116 and a fifth module 118.

It will be appreciated that FIG. 1 is merely an example, which should not unduly limit the scope of the claims herein. It is to be understood that the specific designation for the system 102 for managing user experience in an application portal 104 hosting a plurality of applications is provided as an example and is not to be construed as limiting the system 102 to specific numbers, types, or arrangements of application recorders (such application recorder 106), processing units (such as the processing unit 108), modules (such as the first module 110, the second module 112, the third module 114, the fourth module 116 and the fifth module 118). A person skilled in the art will recognize many variations, alternatives, and modifications of embodiments of the present disclosure.

Figure 2:
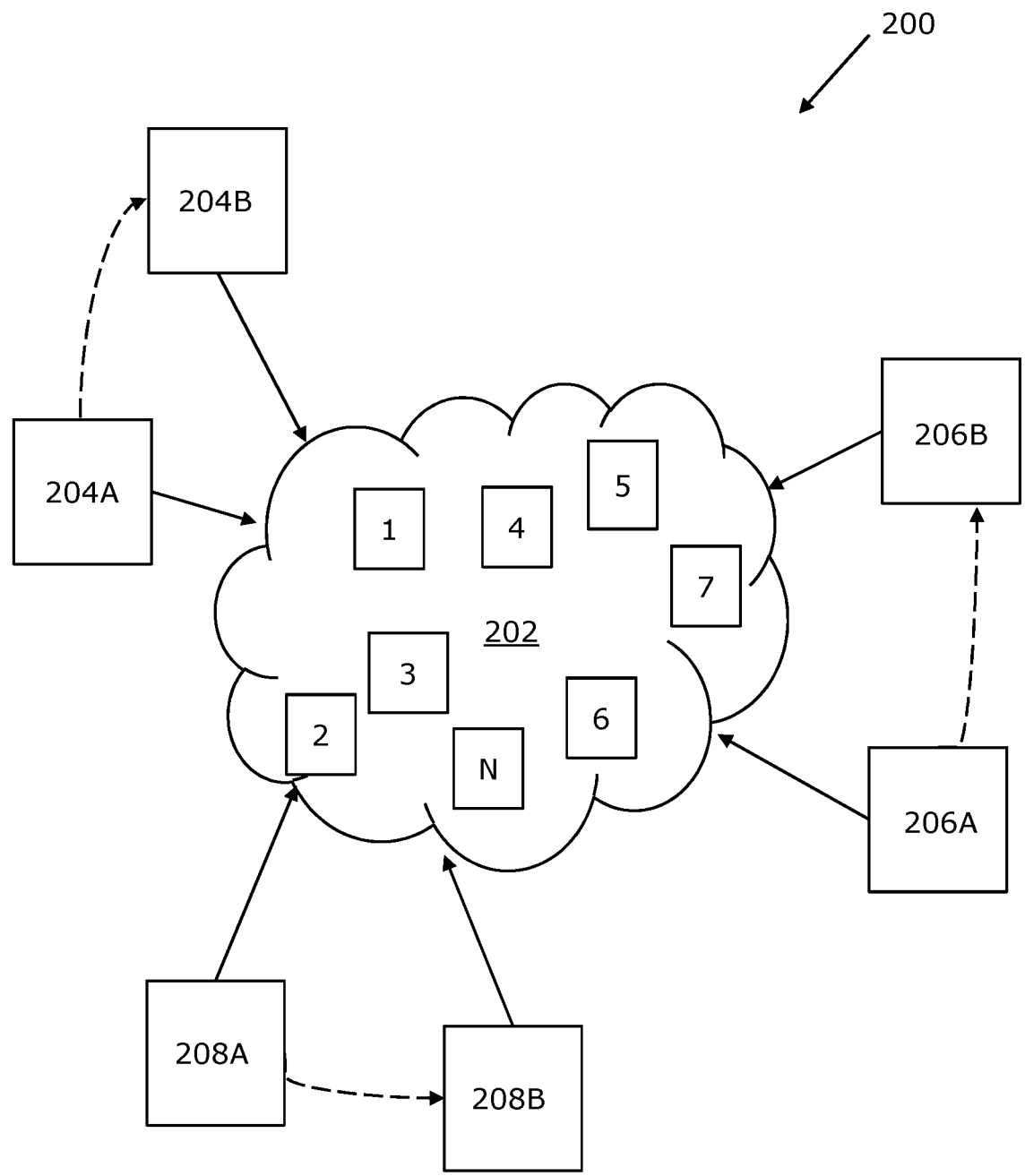
FIG. 2 is a schematic illustration of a network environment depicting interactions between an application portal and a number of users, in accordance with an embodiment of the present disclosure.

Referring to FIG. 2, illustrated is a network environment 200 depicting interaction between an application portal 202 and a number of users such as a first user 204A, a second user 206A and a third user 208A, in accordance with another embodiment of the present disclosure. As shown, the application portal 202 comprises "N" number of applications (namely "1", "2", "3", "4", "5", "6", "7" up to "N"). As shown, a first digital entity 204B is associated with the first user 204A, a second digital entity 206B is associated with the second user 206A, a third digital entity 208B is associated with the third user 208A. At an instant of time, the first user 204A may access the 1st application, while the first digital entity 204B may access the 2nd application. Further, the second user 206A may access the 4th application, while the second digital entity 206B may access the 5th application. Further, the third user 208A may access the 4th application, while the third digital entity 208B may access the 5th application.

Figure 3A:
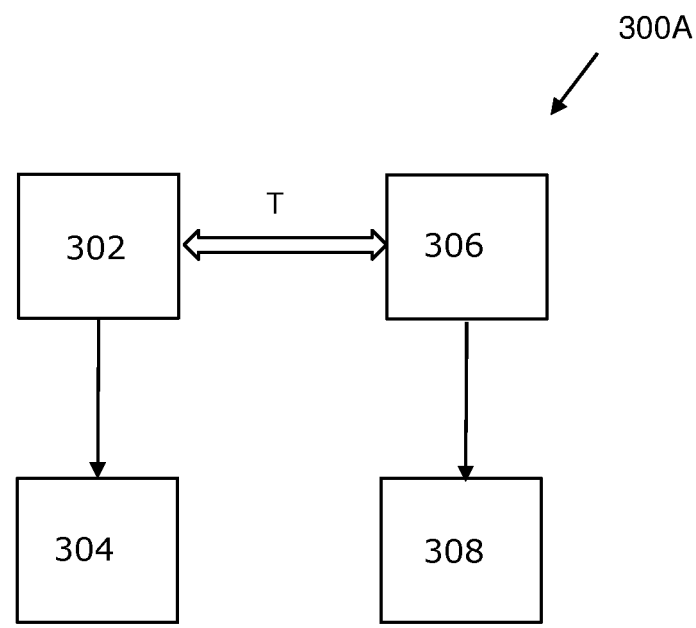
FIGS. 3A and 3B are block diagrams depicting interaction of a user and an associated digital entity with the application portal, in accordance with various embodiments of the present disclosure.

Referring to FIG. 3A, illustrated is a block diagram 300A depicting interaction of a user and an associated digital entity with the application portal at an instant of time, in accordance with an embodiment of the present disclosure. At a first instant of time, a first user 302 is performing actions on a first application 304, and data corresponding to actions of the first user 302 in the first application 304 are recorded. Further, a first digital entity 306 is trained "T" to simulate the actions of the first user 302 and is associated with the first user 302. Then the first digital entity 306 is implemented in a second application 308 to perform actions therein.

Figure 3B:
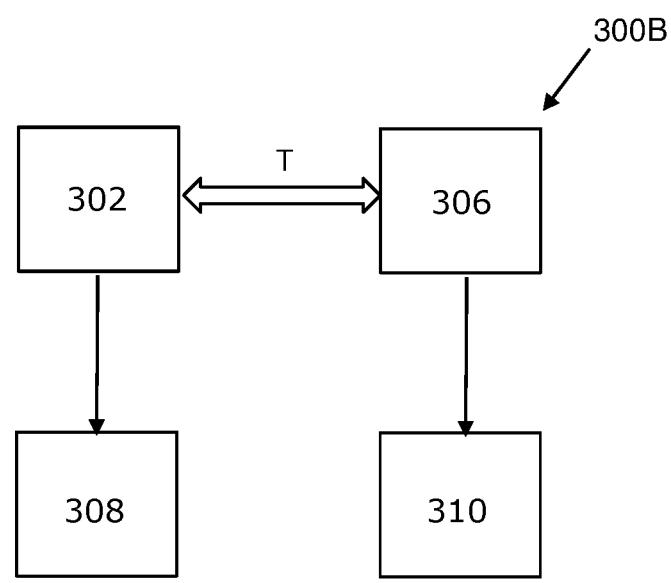

Referring next to FIG. 3B, illustrated is a block diagram 300B depicting interaction a user and an associated entity with the application portal at another instant of time, in accordance with an embodiment of the present disclosure. At this instant of time, the first user 302 is performing actions on the second application 308, and data corresponding to actions of the first user 302 in the second application 308 are recorded. The first digital entity 306 is further trained "T" to update the skills of the first digital entity 306 corresponding to actions of the first user 302 in the second application 308. Then the first digital entity 306 is further implemented in a third application 310 to perform actions therein.

Figure 4A:
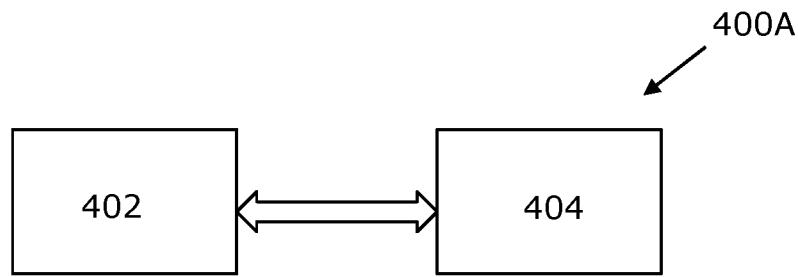
FIG. 4A is a schematic illustration of a block diagram depicting process for association of a first user with a first digital entity, in accordance with an embodiment of the present disclosure.

Referring to FIG. 4A, illustrated is block diagram depicting process 400A for association of a first user 402 with a first digital entity 404, in accordance with an embodiment of the present disclosure. As shown, the first digital entity 404 is associated with the first user 402, wherein the first digital entity 404 is trained to simulate the actions of the first user 402.

Figure 4C:
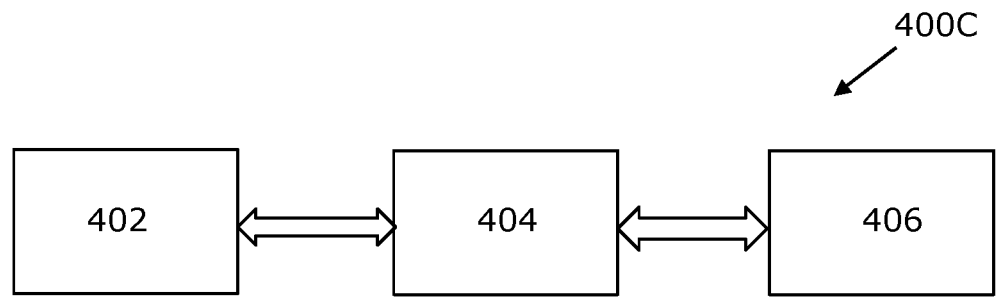
FIGS. 4C and 4D are schematic illustrations of block diagrams depicting process for association of a digital entity with two users according to the cases as shown in FIG. 4B, in accordance with an embodiment of the present disclosure.
Figure 4D:
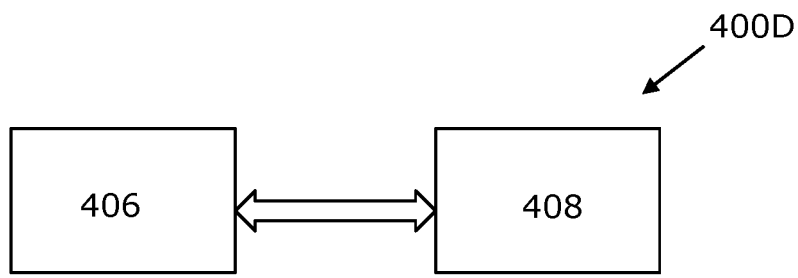
Figure 4B:
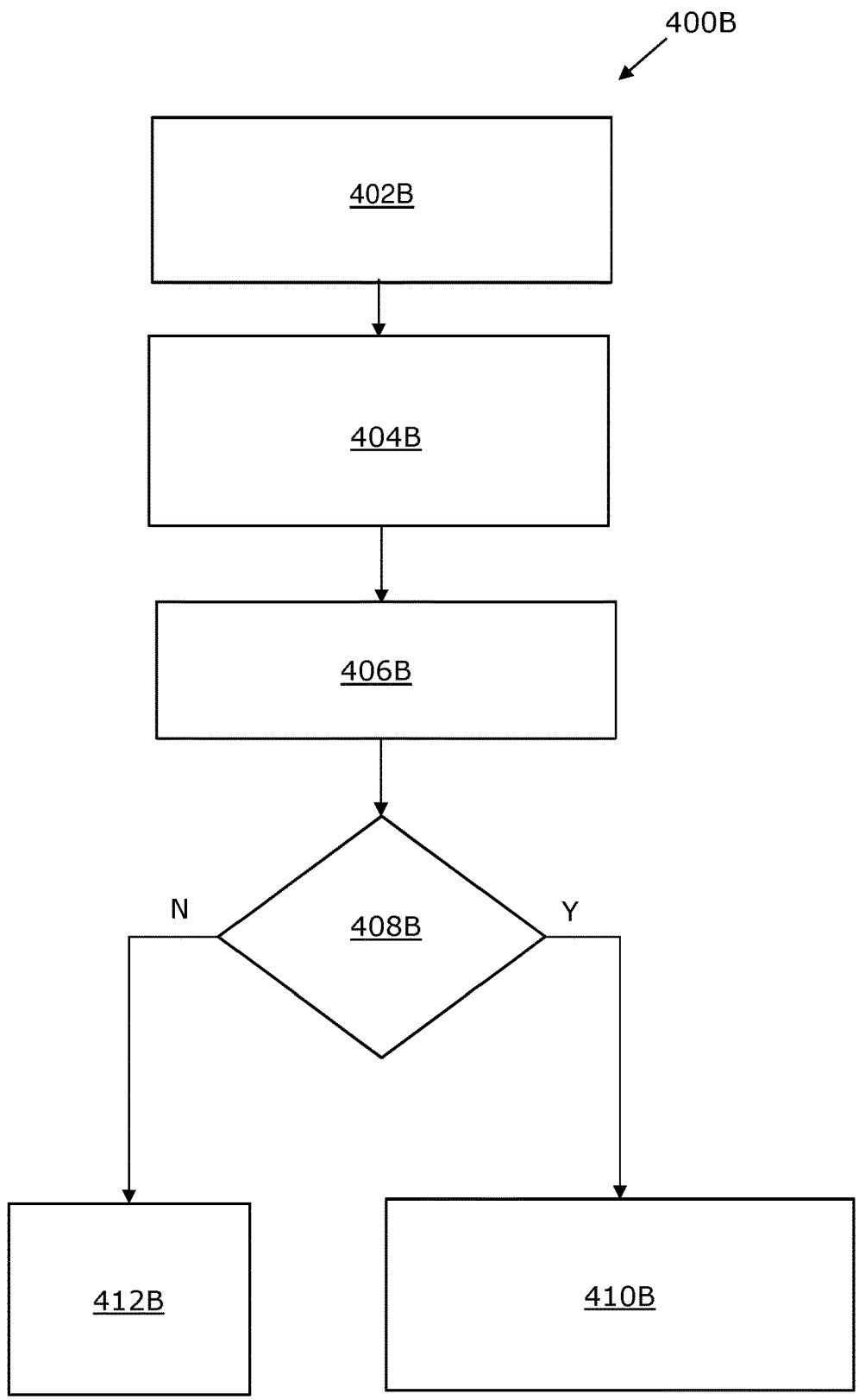
FIG. 4B is a schematic representation of a process for associating a user with a digital entity based on similarity of actions between two users, in accordance with an embodiment of the present disclosure.

Referring to FIG. 4B, illustrated is a schematic representation of a process 400B for associating a user with a digital entity based on similarity of actions between two users, in accordance with an embodiment of the present disclosure. At step 402B, the data corresponding to actions of the second user on the first application is captured. At step 404B, the captured data for the second user is compared to the captured data for the first user. At step 406B, a matching score is determined based on the comparison between the captured data for the first user and the captured data for the second user. At step 408B, a decision is made that whether matching score is above a predetermined threshold. Notably, path "Y" is followed when the matching score is above the predetermined threshold, and path "N" is followed when the matching score is below the predetermined threshold. In a case when path "Y" is followed, at step 410B, the first digital entity of the first user is associated with the second user. In a case when path "N" is followed, at step 412B, a second digital entity is generated and trained corresponding to actions of the second user on the first application.

Referring to FIG. 4C and FIG. 4D, illustrated are block diagrams depicting processes 400C and 400D for association of a digital entity with two users according to the cases as shown in FIG. 4B, in accordance with an embodiment of the present disclosure. As shown in FIG. 4C, the first digital entity 404 is associated with both the first user 402 and the second user 406. It will be appreciated that the first user 402 and the second user 406 are associated with the first digital entity 404 when matching score is above the predetermined threshold. As shown in FIG. 4D, the second user 406 is associated with the second digital entity 408. It will be appreciated that the second user 406 is associated with the second digital entity 408 when the matching score is below the predetermined threshold.

Figure 5:
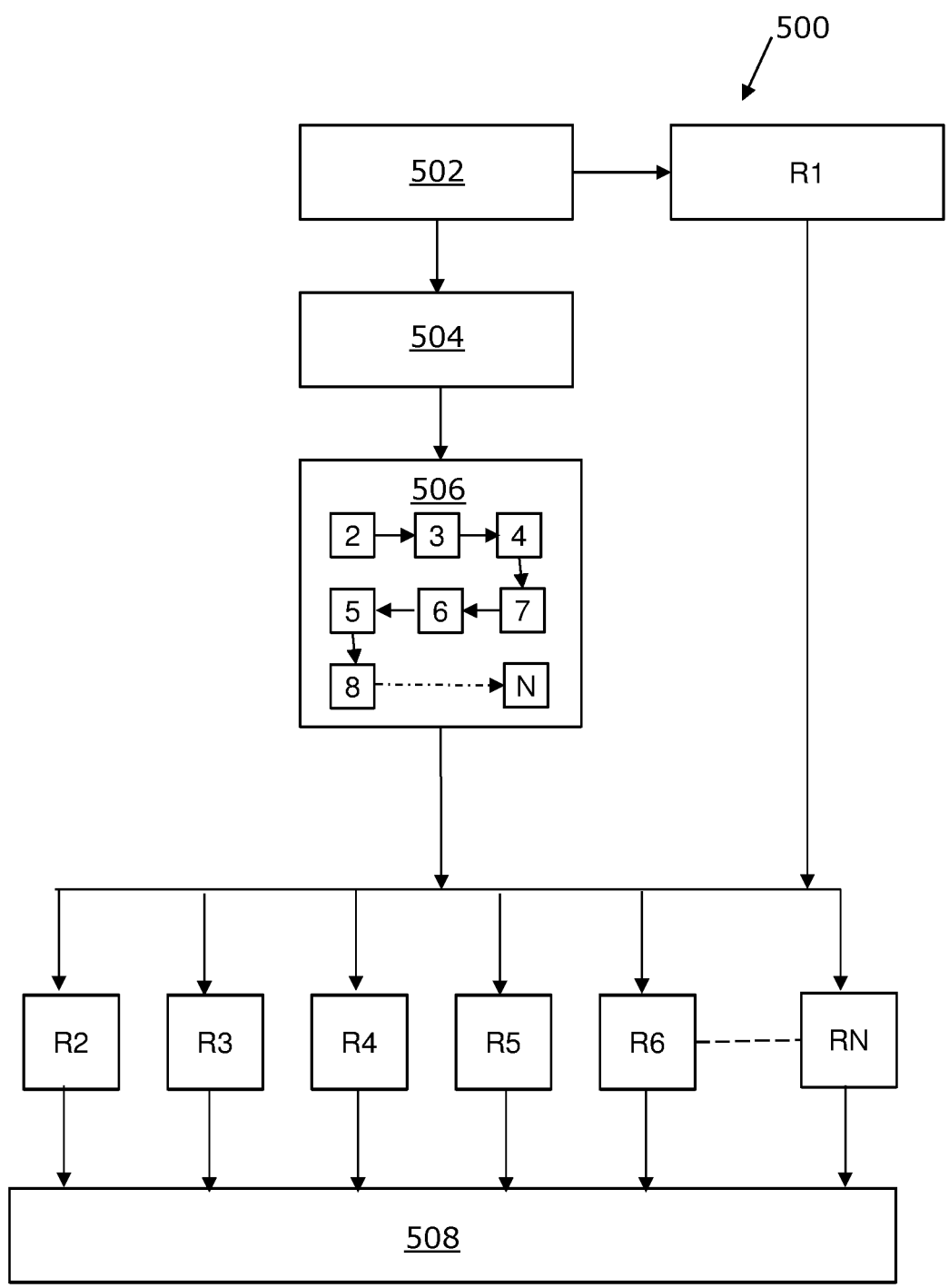
FIG. 5 is a schematic illustration a block diagram depicting process for generation of recommendations of one or more application for a user, in accordance with an embodiment of the present disclosure.

Referring to FIG. 5, illustrated is a block diagram 500 depicting generation of recommendations of one or more application for a user, in accordance with an embodiment of the present disclosure. As shown, at step 502, a first rating value "R1" is received from the first user for actions performed in a first application. Further, at step 504, a first digital entity is generated. Further, at step 504, the first digital entity is implemented to simulate the actions of the first user in a plurality of applications in the application portal. That is, the first digital entity is consecutively implemented in "N" number of applications (namely, "2", "3", "4", "5", "6", "7", "8" and "N") in the application portal. Further, a rating value is calculated for each of the plurality of applications in the application portal. As shown, the rating value "R2" is calculated corresponding to application "2", the rating value "R3" is calculated corresponding to application "3", the rating value "R4" is calculated corresponding to application "4", the rating value "R5" is calculated corresponding to application "5", the rating value "R6" is calculated corresponding to application "6", the rating value "R7" is calculated corresponding to application "7", the rating value "R8" is calculated corresponding to application "8", and the rating value "RN" is calculated corresponding to application "N". Notably, the recommendations "R2", "R3", "R4", "R5", "R6" and "RN" are calculated based on the rating value "R1". At step 508, the recommendations "R2", "R3", "R4", "R5", "R6" and "RN" are displayed in a user interface for reference of the first user.

Figure 6A:
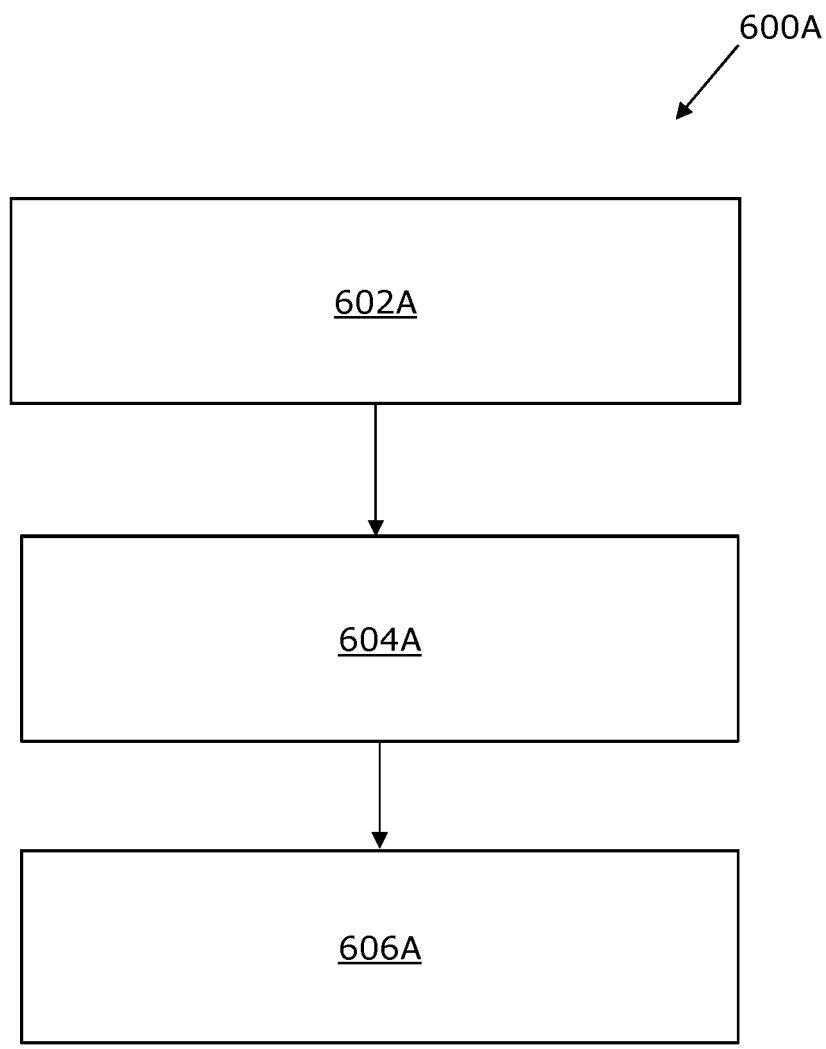
FIGS. 6A and 6B are schematic representations of processes for iteratively training the first digital entity, in accordance with various embodiments of the present disclosure.

Referring to FIG. 6A, illustrated is a schematic representation of a process 600A for iteratively training the first digital entity, in accordance with an embodiment of the present disclosure. At step 602A, the first user performs actions on the first application for "N" number of times. At step 604A, "N" number of training datasets are generated. Herein, the first training dataset is generated when the first application is accessed by the first user for the first time, the second training dataset is generated when the first application is accessed by the first user for the second time, and so on the Nth training dataset is generated when the first application is accessed by the first user for the Nth time. At step 606A, the first digital entity is iteratively trained and constantly updated based on the generated training datasets. Notably, when the first application has been accessed "N" number of times, the first digital entity has been trained for a total of "N" number of times.

Figure 6B:
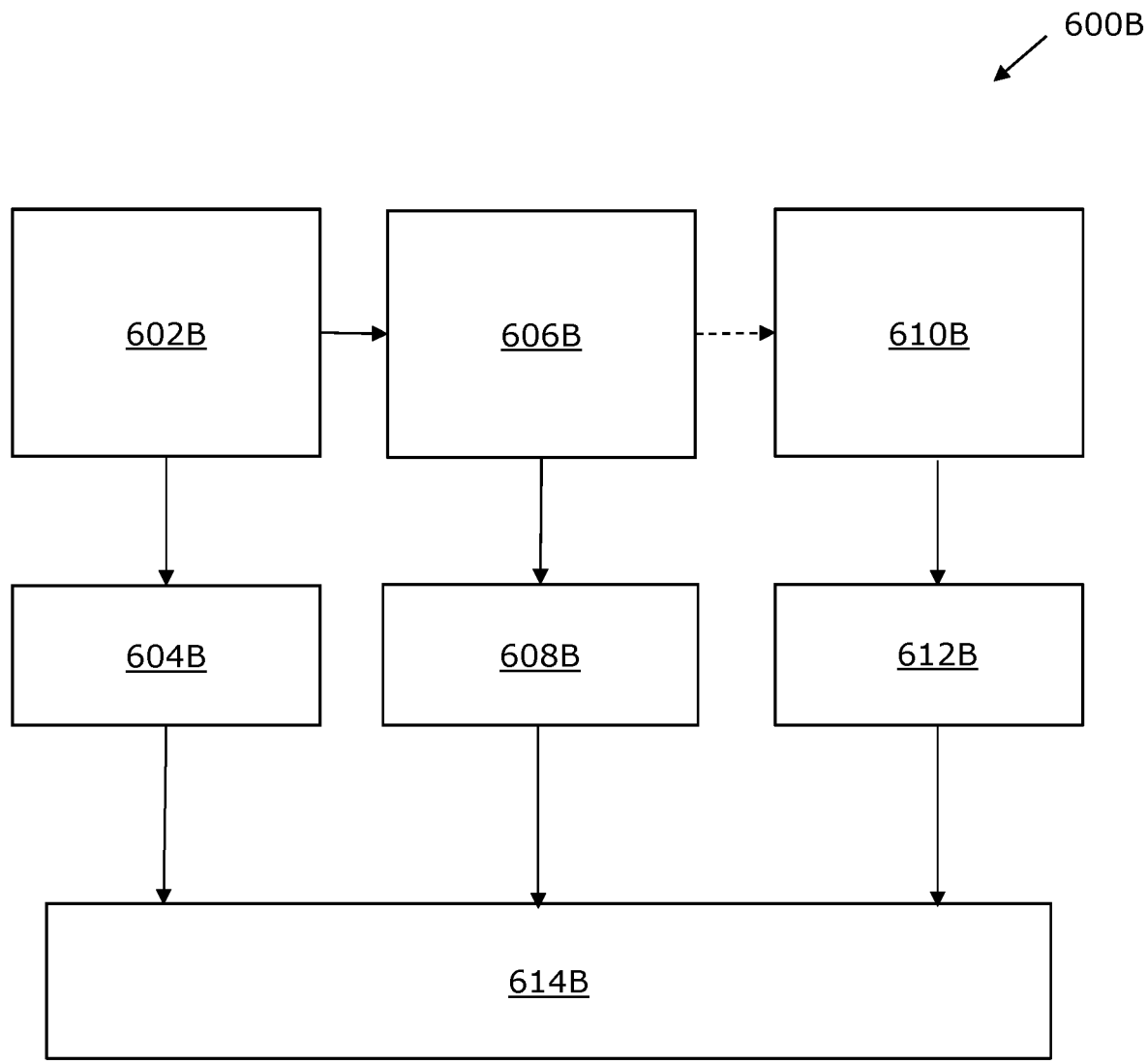

Referring to FIG. 6B, illustrated is a schematic representation of a process 6006 for iteratively training the first digital entity based on the data corresponding to actions of the first user on one or more other applications, in accordance with an embodiment of the present disclosure. At step 602B, the first user performs actions on the first application for "i" number of times. At step 604B, "i" number of training datasets are successively generated. At step 606B, the first user performs actions on a second application for "j" number of times. At step 608B, "j" number of training datasets are successively generated. At step 610B, the first user performs actions on an Nth application for "k" number of times. At step 6128, "k" number of training datasets are successively generated. At step 614, the first digital entity associated with the first user is iteratively trained. Notably, when the Nth application has been accessed "k" number of times, the first digital entity has been trained for a total of (i+j+k) number of times.

Figure 7:
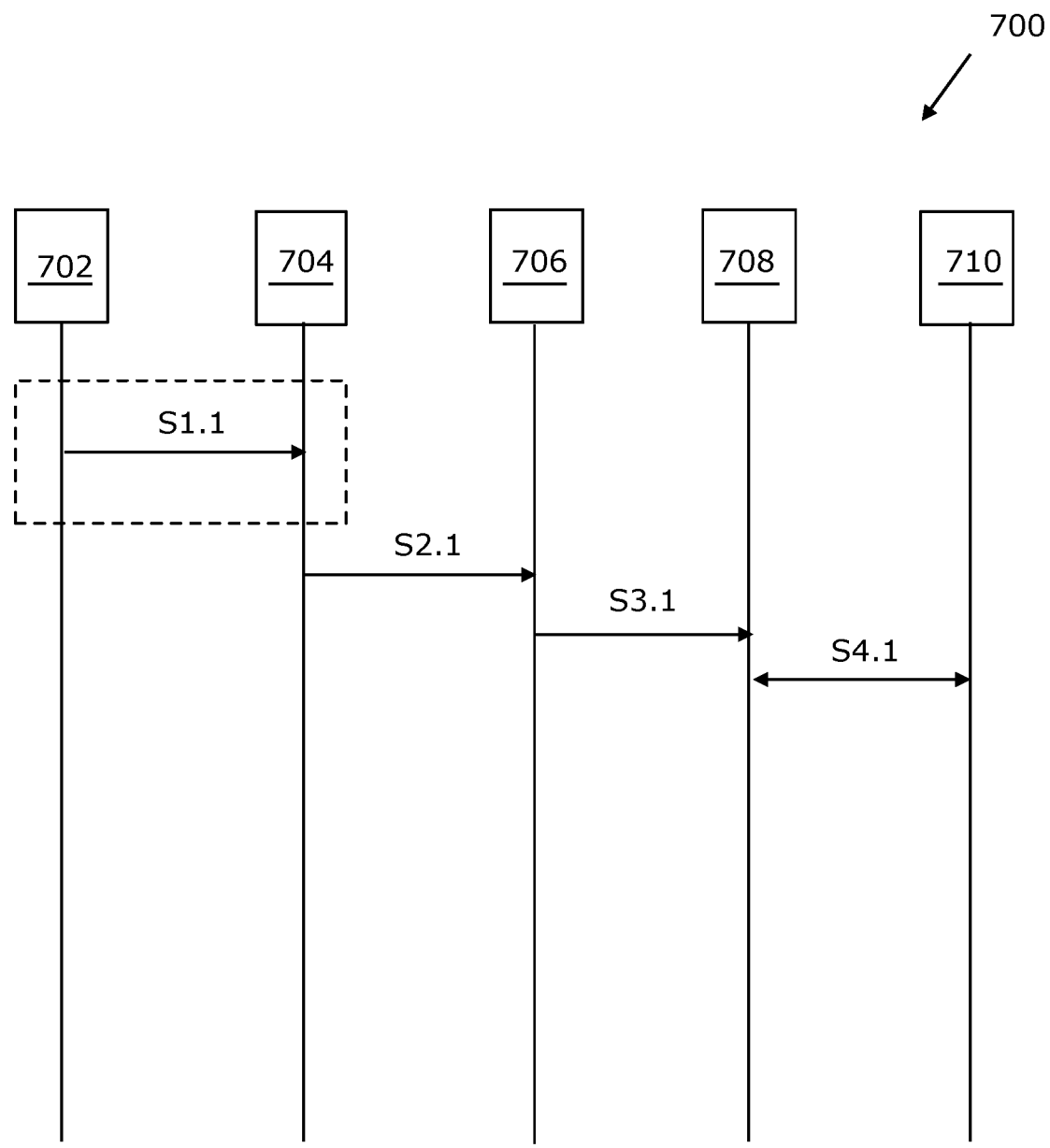
FIG. 7 is a schematic illustration of exemplary sequence diagram of implementation of a system for managing user experience in an application portal hosting a plurality of applications (for example, such as the system of FIG. 1), in accordance with an embodiment of the present disclosure.

Referring to FIG. 7, illustrated is a schematic exemplary sequence diagram 700 of implementation of a system for managing user experience in an application portal hosting a plurality of applications (for example, such as the system 102 of FIG. 1), in accordance with an embodiment of the present disclosure. At step S1.1, a first application 702 runs on a user device associated with a first user, and the actions of the first user are captured by an application recorder and stored in a database 704. At step S2.1, the data from the database is acquired by a first module 706, to train a first digital entity. At step S3.1, the first digital entity is transmitted to the second module 708. At step S4.1, the first digital entity is implemented in a second application 710.

Figure 8:
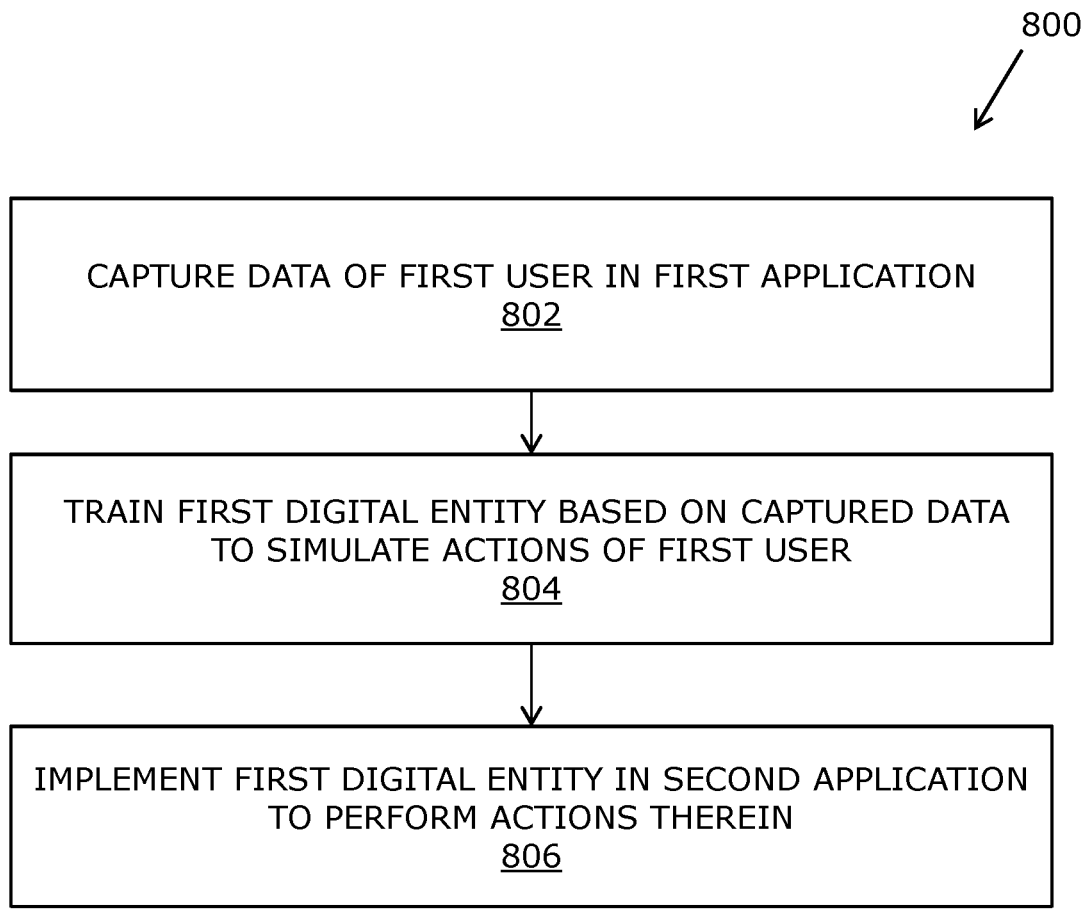
FIG. 8 illustrates a flow chart of a method for managing user experience in an application portal hosting a plurality of applications, in accordance with an embodiment of the present disclosure.

Referring to FIG. 8, illustrated is a flow chart of a method 800 for managing user experience in an application portal hosting a plurality of applications, in accordance with an embodiment of the present disclosure. At step 802, data corresponding to actions of the first user is captured in the first application. At step 804, a first digital entity is trained based on the captured data to simulate actions of the first user. At step 806, the first digital entity in the second application is implemented to perform actions therein.

The steps 802 to 806 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for managing a user experience in a gaming application portal hosting a plurality of different gaming applications including a first gaming application and a second gaming application, the system comprising:
   an application recorder embodied on a non-transitory computer readable storage device and configured to capture data corresponding to actions of a first user in a playing of the first gaming application of the gaming application portal, wherein the data captured by the application recorder comprises skills executed by the first user to perform each of the actions in the first gaming application and at least one of a duration of time taken by the first user to perform each of the actions in the first gaming application and a number of levels successfully completed by the first user in the first gaming application; and
   a hardware processor communicatively coupled to the application recorder, the hardware processor comprising:
      a first module configured to:
         acquire the captured data from the application recorder; and
         train a first digital entity based on the captured data to simulate the actions of the first user, wherein the first module implements machine learning algorithms for training of the first digital entity; and
      a second module configured to:
         implement the first digital entity at an initial level in an active state of the second gaming application, the first digital entity being configured to execute the simulated actions of the first user in a playing of the second gaming application, the playing of the second gaming application being independent of the playing of the first gaming application; and
         control a point of entry of the first user in the second gaming application based on the actions performed by the first digital entity during the playing of the second gaming application by:
            determining a level achieved by the first digital entity during the playing of the second gaming application;
            discontinue a playing action of the first digital entity in the second gaming application at the determined level;
            enable the first user to enter and play the second gaming application starting at a next level subsequent to the determined level.

2. The system according to claim 1, wherein the second gaming application comprises an application program interface configured to check for compatibility of the first digital entity with the second gaming application, and wherein the application program interface is configured to allow the second module for implementation of the first digital entity in the second gaming application if the first digital entity is compatible with the second gaming application.

3. The system according to claim 1, wherein the hardware processor further comprises a third module configured to allow the first user to set one or more permissions about implementation of the first digital entity corresponding thereto for the plurality of gaming applications in the gaming application portal.

4. The system according to claim 3, wherein the third module is further configured to limit access of the second module to the second gaming application for implementation of the first digital entity therein up to a predetermined number of initial levels therein based on the one or more permissions set by the first user corresponding to the second gaming application.

5. The system according to claim 1, wherein the application recorder is further configured to capture data corresponding to actions of a second user on the first gaming application, and wherein the hardware processor further comprises a fourth module configured to:
compare the captured data for the second user to the captured data for the first user;
determine a matching score based on the comparison; and
associate the generated first digital entity of the first user with a profile of the second user for implementation thereby, if the matching score is above a predetermined threshold.

6. The system according to claim 1, wherein the hardware processor further comprising a fifth module configured to:
receive a rating value for the first gaming application from the first user;
implement, consecutively, the first digital entity in the plurality of gaming applications in the application portal; and
calculate a rating value for each of the plurality of gaming applications based on the rating value for the first gaming application received from the first user.

7. The system according to claim 6, wherein the fifth module is further configured to generate recommendations of one or more gaming applications from the plurality of gaming applications for the first user based on the respective calculated rating values therefor.

8. The system according to claim 1, wherein the application recorder is further configured to successively capture data corresponding to actions of the first user on one or more other gaming applications, other than the first gaming application, in the application portal, and wherein the first module is further configured to iteratively train the first digital entity based on the data corresponding to actions of the first user on the one or more other gaming applications.

9. The system according to claim 1, wherein the application portal is a cloud server, and wherein the application recorder is executed in the cloud server.

10. The system according to claim 1, wherein the system is implemented for beta testing of the plurality of gaming applications.

11. The system according to claim 1, wherein the application portal is a video games library, and wherein the first gaming application and second gaming application are of a same genre of video games.

12. The system according to claim 1, wherein the first digital entity associated with the first user is an artificial intelligence bot.

13. A computer implemented method for managing a user experience in gaming application portal hosting a plurality of gaming applications, including a first gaming application and a second gaming application, the method comprising:
capturing data corresponding to actions of a first user in a playing of the first gaming application of the gaming application portal, wherein the data captured by the application recorder comprises skills executed by the first user to perform each of the actions in the first gaming application and at least one of a duration of time taken by the first user to perform each of the actions in the first gaming application and a number of levels successfully completed by the first user in the first gaming application;
training a first digital entity based on the captured data to simulate actions of the first user, wherein the first module implements machine learning algorithms for training of the first digital entity;
implementing the first digital entity at an initial level in an active state of the second gaming application, the first digital entity being configured to execute the simulated actions of the first user in a playing of the second gaming application, the playing of the second gaming application being independent of the playing of the first gaming application; and
controlling a point of entry of the first user in the second gaming application based on the actions performed by the first digital entity during the playing of the second gaming application by:
determining a level achieved by the first digital entity during the playing of the second gaming application;
discontinuing a playing action of the first digital entity in the second gaming application at the determined level; and
enabling the first user to enter and play the second gaming application starting at a next level subsequent to the determined level.

14. The method according to claim 13, further comprising:
checking for compatibility of the first digital entity with the second gaming application; and
allowing the implementation of the first digital entity in the second gaming application if the first digital entity is compatible with the second gaming application.

15. The method according to claim 13, further comprising allowing the first user to set one or more permissions about implementation of the first digital entity corresponding thereto for the plurality of gaming applications in the gaming application portal.

16. The method according to claim 15, further comprising limiting implementation of the first digital entity in the second gaming application up to a predetermined number of initial levels therein based on the one or more permissions set by the first user corresponding to the second gaming application.

17. The method according to claim 13, further comprising:
capturing data corresponding to actions of a second user on the first gaming application;
comparing the captured data for the second user to the captured data for the first user;
determining a matching score based on the comparison; and
associating the generated first digital entity of the first user with a profile of the second user for implementation thereby, if the matching score is above a predetermined threshold.

18. The method according to claim 13, further comprising:
receiving a rating value for the first gaming application from the first user;
implementing, consecutively, the first digital entity in the plurality of gaming applications in the gaming application portal; and
calculating the rating value for each of the plurality of gaming applications based on the rating value for the first gaming application received from the first user.

19. The method according to claim 18, further comprising generating recommendations of one or more gaming applications from the plurality of gaming applications for the first user based on the respective calculated rating values therefor.

20. The method according to claim 13, further comprising successively capturing data corresponding to actions of the first user on one or more other gaming applications, from the first gaming application, in the gaming application portal, and wherein the first module is further configured to iteratively train the first digital entity based on the data corresponding to actions of the first user on the one or more other gaming applications.

21. The system according to claim 1, wherein the first gaming application is a different game than the second gaming application.

22. The system according to claim 1, where the gaming application portal comprises at least a first application portal hosting the first gaming application and a second application portal hosting the second gaming application, wherein the first application portal is independent from the second application portal.

23. The system according to claim 1, wherein the second module is further configured to consecutively implement the first digital entity in "N" number of the plurality of different gaming applications, where N is a finite whole number, the first digital entity being configured to perform the action of the first user in the N number of the plurality of different gaming applications.

24. The system according to claim 1 wherein the second module is further configured to make the second application inaccessible to the first digital entity after the point of entry of the first user in the second application.

25. The system according to claim 1, wherein the second module is further configured to restrict implementation of the first digital entity beyond a predetermined level of the second application.

26. The computer implemented method according to claim 13 further comprising making the second application inaccessible to the first digital entity after the point of entry of the first user in the second application.

27. The computer implemented method according to claim 13, further comprising restricting implementation of the first digital entity beyond a predetermined level of the second application.

* * * * *